Figure 1:
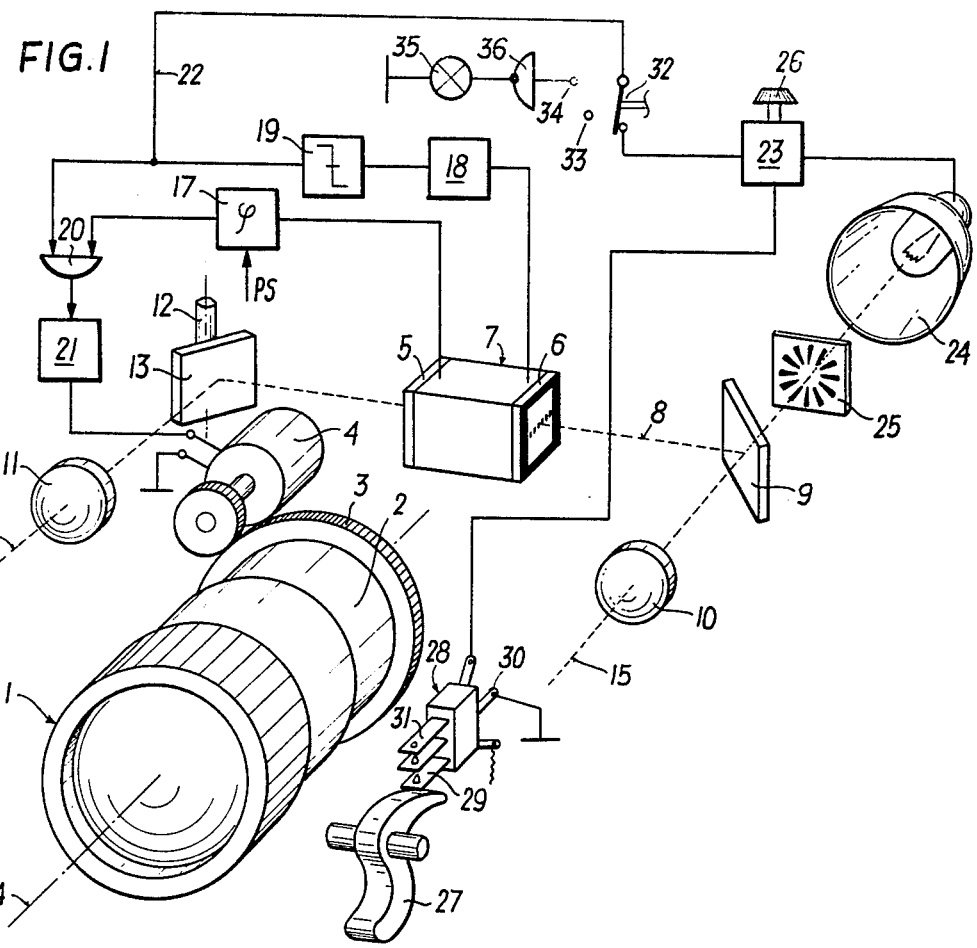

United States Patent [19]
Freudenschuss

[11] 4,255,029
[45] Mar. 10, 1981

[54] FOCUSING DEVICE

[75] Inventor: Otto Freudenschuss, Vienna, Austria

[73] Assignees: Karl Vockenhuber; Raimund Hauser, both of Vienna, Austria

[21] Appl. No.: 68,130

[22] Filed: Aug. 20, 1979

[30] Foreign Application Priority Data

Sep. 4, 1978 [CH] Switzerland ..................... 9272/78

[51] Int. Cl.³ ........................... G01J 1/36; G03B 3/10
[52] U.S. Cl. ..................................... 354/25; 250/201
[58] Field of Search ............... 250/201; 354/163, 195, 354/25

[56] References Cited

U.S. PATENT DOCUMENTS

| | | | |
|---|---|---|---|
| 3,435,744 | 4/1969 | Stimson | 354/25 |
| 3,471,863 | 10/1969 | Harrison et al. | 346/109 X |
| 3,529,528 | 9/1970 | Leitz | 354/25 |
| 3,653,762 | 4/1972 | Harvey | 354/163 X |
| 3,813,679 | 5/1974 | Hasegawa et al. | 354/195 X |
| 4,080,531 | 3/1978 | Stauffer | 354/25 X |
| 4,153,834 | 5/1979 | Hayamizu | 250/201 |

*Primary Examiner*—Donald A. Griffin
*Attorney, Agent, or Firm*—Martin A. Farber

[57] ABSTRACT

A focusing device for the focusing movement of at least one member of an objective lens, with at least one photoelectric transducer or sensing device which is arranged on the axis of an optical system, by which transducer device in dependency on the contrast of the scene to be photographed which is illuminated by the ambient light a signal is able to be produced (passive range finding) and with an evaluation device for the signal which is produced by the photoelectric transducer device, by which device a special evaluation signal is able to be produced during insufficient contrast of the object to be photographed. By this special evaluation signal, a transmitting device for emitting an (active) distance measuring wave packet on the object to be photographed can be turned on by means of a switching device.

16 Claims, 2 Drawing Figures

U.S. Patent

Mar. 10, 1981

4,255,029

FOCUSING DEVICE

The invention relates to a focusing device for the focusing movement of at least one member of an objective lens, with at least one photoelectric transducer or sensing device which is arranged on the axis of an optical system, by which transducer device in dependency on the contrast of the scene to be photographed which is illuminated by the ambient light a signal is able to be produced (passive range finding) and with an evaluation device for the signal which is produced by the photoelectric transducer device, by which device a special evaluation signal is able to be produced during insufficient contrast of the object to be photographed.

Such devices for the user who conceivably has spent a lot of money are a disappointment insofar as then the user expects an automatic focusing under all conditions. However sometimes by the special evaluation signal the user merely obtains the information that such focusing can not be performed. At times it is simply because the focusing device has a predetermined measuring range and this range simply does not suffice for the measurement which is to be carried out. According to an old, not previously published proposal, thus a measurement range change-over or shifting shall be provided for such cases. This measure however only helps where the insufficient measuring range is the reason for the presence of the named special evaluation signal. Generally however the measurement range of focusing devices is completely sufficient for normal photographing, and it is the reason to seek the presence of this signal in insufficient contrast of the object to be photographed, or respectively, in bad light conditions. Therefore according to another older, not previously published proposal, one has provided filters, because for example the contrast in the red or in another color spectrum of the light may be greater than in other spectrums. If this however is not the case, even the adding of filters is not useful. Although it is known to provide so-called active range finding devices, which by means of a transmitting device emit wave packets, whereby the evaluation occurs either according to the principle of the base range finder measurement or even according to the running time measurement. The emitted wave packets thereby can be sound waves, particularly ultrasonic waves, such as electromagnetic waves, for example visible light or light of the infrared range. The disadvantage of such systems is that they naturally cause a comparatively high current consumption, which particularly with devices which can be carried, such as cameras, with only limited battery space, is unpleasant. In addition many photographic objects, for example, animals or plants are disturbed by wave packets radiated from the transmitting device, so that it is no longer possible to obtain a life-like or actual, undisturbed photographing.

It is an object of the present invention to provide a focusing device of the introductory-mentioned type such that even with the existence of the named special evaluation signal still an automatic focusing is possible.

According to the invention by this special evaluation signal, a per se known transmitting device for emitting an (active) distance measuring wave packet on the object to be photographed can be turned on by means of a switching device.

In this manner for the majority of all existing cases the transmitting device will remain turned off and only the passive range finding will operate, so that current is saved. Only when with the help of the passive range finding, because of insufficient contrasts no result can be achieved any longer, does one change or switch over to the active range finding by means of the transmitting device. In this manner it is advantageous if the transmitting device has a per se known projection device for electromagnetic waves, in the beam path of which there are arranged at least parts of the optical system of the passive range finding device and by which projection device a pattern can be projected onto the object to be photographed in a per se known manner. The pattern for example, may even be merely a light spot.

For indeed in this manner a majority portion of the optical, but in general also the photoelectrical, device of the passive range finding are used also for the active range finding, so that the expense for this additional portion can be kept small and in the ideal case for all practical purposes it comprises only the projection device. As already mentioned, the pattern to be projected can comprise even merely a light spot, because then a contrast results between this light spot and the adjacent dark surfaces. But it is for example also already known from U.S. Pat. No. 3,653,762 to project a pattern of predetermined contrast on the pointed at or sighted object. Such patterns in the form of a ruled grating or so-called Siemans-Stars are known per se. Should it deal with avoiding the disturbance of animals or the like which are to be photographed, then under the circumstances if necessary between the evaluation device and the transmitting device there can be provided a voluntarily actuatable interrupter or contact breaker. By means of this interrupter for such photographing the transmitting device can be turned off. One then has to accept the risk that the automatic focusing is not possible under the given circumstances. It is also known that per se a disturbance is extensively avoided when light of the infrared range is used. It should moreover be mentioned that the invention in no manner is limited to a certain passive range finder system, but rather it is suitable for all passive systems in which the contrast plays a part.

According to another object of the invention the optical system includes a reflection mirror for the projection beam through which the beam is able to be aligned on the optical axis of the passive range finding device.

According to a further object of the invention the reflection mirror at least during the active range finding operation has a partially transparent surface for the projection beam.

It is yet another object of the invention to provide: by means of the special evaluation signal in a per se known manner, the reflection mirror has a surface of controllable reflectivity.

According to still another object of the invention a pattern to be projected on the object is applied on the reflection mirror.

It is still another object of the invention to provide a voluntarily actuatable interrupter means between the evaluation device and the transmitting means.

According to a further object of the invention the interrupter is formed as a change-over switch for changing the special evaluation signal over to an indicator device.

It is a further object of the invention to provide the switching device with a self-holding or -locking circuit.

According to a still further object of the invention the self-holding circuit is controlled by the camera shutter release and is opened with the camera shutter release located in a neutral or rest position.

Figure 2:
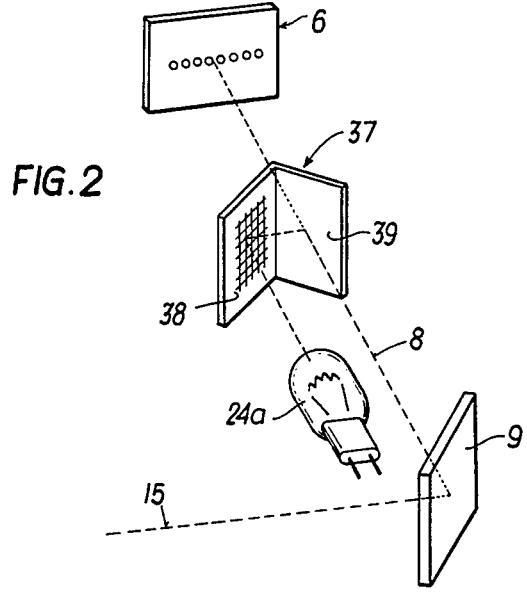

With the above and other objects and advantages in view, the present invention will become more clearly understood in connection with the detailed description of preferred embodiments, when considered with the accompanying drawing, of which:

FIG. 1 is a perspective and block schematic illustration of a focusing device formed in accordance with the present invention; and FIG. 2 is a modification of a detail of FIG. 1 also in perspective view.

In a camera which otherwise is not illustrated in detail, an objective lens 1 is provided, which by means of a focusing tube 2 can be adjusted by a focusing motor 4, by means of a sprocket wheel or toothed wheel rim 3, to the respective distance or range from time to time. The focusing motor 4 is connected at the output of the electronics of the focusing device, on the input of which in a known manner according to the illustrated embodiment example there are two rows of diodes 5, 6 in an integrated circuit 7, which diode rows receive light from the scene to be photographed or recorded via a base line 8.

On one end of which a mirror 9 which is fixed on the device and a lens system or compound lens 10 (which is indicated by a single lens in the drawing merely for simplicity of illustration) form a first optical system, whereas on the other side a second optical system comprises a lens system or compound lens 11 and a mirror 13, which mirror 13 swings periodically about an axle 12. All these parts are components of a known passive range finder system, of which it likewise is known, instead of the lens systems 10, 11 with axes 15, 16 which run parallel to the optical axis 14 of the objective lens 1, to provide an optical system of the type of a coincidence (superposed-image) range finder, by means of which optical system the two pictures are able to be fed or supplied to the diode rows 5, 6.

It is further known that upon correspondence or agreement of the received pictures, the two rows of diodes 5, 6 supply, for example, a pulse-shaped, output signal to a phase comparator 17, which comparator in a manner not further illustrated receives a position signal PS corresponding to the position of the focusing tube 2 of the objective lens 1 for the comparison. Beyond that an additional output is provided from the integrated circuit 7, which additional output is fed by means of a pulse processing stage 18 to a threshold value switch 19, by means of which threshold value switch 19 it is determined whether the contrast of the photographing objective lens is sufficient. If this is the case, at the output of the threshold value switch 19 there occurs a signal, which signal opens the gate circuit 20, so that the output signal of the phase comparator 17 can be fed to a control circuit 21 for the motor 4.

The previously described parts belong to the state of the art. As evident from the drawing the output signal of the threshold value switch 19 is also fed by means of a line 22 to a control circuit 23 for a projection lamp 24, the projection axis of the lamp being flushly aligned with the axis 15 of the lens system 10. If the contrast threshold value for the threshold value switch 19 is too small, so that no signal occurs at its output consequently the gate 20 for the focusing motor 4 would remain closed, then the absence of the signal over the line 22 and over the control circuit 23 effects the switching-on of the projection lamp 24, which lamp consequently by means of the lens system 10 directs a light beam onto the object. This light beam improves the contrast. In addition, in the projection beam path of the projection lamp 24 there can be provided a translucent or transparent foil 25 with a pattern of predetermined contrast, in the illustrated case in the form of a Siemens-Star (Siemens-Sterns). As soon as the contrast on the pointed at or sighted object increases, the contrast value increases so that again a signal occurs at the output of the threshold value switch 19. In this manner the gate 20 is again opened, but the projection lamp 24 by means of the line 22 and the control circuit 23 again is switched off. In this manner consequently an intermittent measuring is provided. If the time constant of the switching operations is large enough, this can certainly be a possible operating mode. Since however by the periodical switching off of the projection lamp 24 the danger exists that the focusing is delayed, the arrangement can be met such that the control circuit 23 includes a self-holding or -locking circuit, which self-holding circuit prevents the periodic switching off of the projection lamp 24. This self-holding circuit can be realized in the form that via the line 22 a monoflop (a monostable multivibrator) of sufficiently large, and under circumstances if necessary voluntarily by means of an adjustment knob 26 of adjustable, time constant, is flipped into the operating condition, which condition then accordingly continues for a correspondingly long time.

Additionally or in a substitutable manner however the self-holding circuit can also be controlled by the camera shutter release 27, which shutter release controls a switch 28 with three contacts 29, 30 and 31. Of these contacts the middle contact 30 is grounded, whereas the contact 29 leads to the camera motor (not illustrated). The contact 31, on the other hand by means of the contact 30 with the actuated camera shutter release 27, holds the holding (or locking) circuit for the projection lamp 24 closed so that after a one-time single switching-on by means of the threshold value switch 19 the lamp 24 remains in operation until the camera shutter release 27 is released and returns into the shutter release rest position.

Naturally the signal of the line 22, instead of being fed to the projection lamp 24, could even be fed to another active range finder system, for example an ultrasonic range finder; however it is evident that for the evaluation of the signals of a ultrasonic range finder device most parts of the illustrated circuit and the optical systems 9, 10 and 11, 13 would not be useable, so that they must be separately provided. By the use of an optically active range finder device in the form of the projection lamp 24, however the additional expense which occurs is kept extremely small. It is clear that in this manner the mirror 9 must be semi-(partially) transparent completely or at least partially along the optical axis 15, whereby if necessary or desireable under the circumstances from time to time the mirror 9 can have for example on its rear side the pattern of predetermined contrast, which pattern is arranged in FIG. 1 on a separate transparent plate or foil 25, so that a separate carrier for this pattern can be dispensed with and is not necessary. As already mentioned however the arrangement of a special pattern in any case can be dispensed with.

If an infrared light beam is emitted from the projection lamp 24, then in general no disturbances of the objects which are to be photographed are to be feared. In other cases there can be provided in the line 22 a voluntary, for example, manually actuatable interruption switch 32, which switch 32 for example can be constructed as a changeover switch or reversing switch. For this purpose for example after the interruption of the line 22, the switch 32 can be brought either into a center position on the terminal 33, so that neither the switching-on of the projection lamp 24, nor an indication concerning the not performable focusing occurs, or the switch 34 can be brought into its position on the terminal 34 likewise interrupting the line 22. If however the switch 32 is placed on the terminal 34, then the line 22 is connected to the indicator lamp 35, which indicator lamp under the circumstances from time to time indicates, via the inverter or NOT stage 36, the inability to perform the automatic focusing. The lamp 35 can of course be constructed as a light-emitting diode (LED), or respectively, in any case another type of the indication can be provided.

While with the embodiment example illustrated in FIG. 1 the lamp 24 illuminates or shines through the semitransparent mirror 9, the arrangement can be satisfied or taken care of in a per se known manner, such that in the beam path along the optical axis 15 and/or on the base line 8, a pivotal or slideable or shiftable reflecting mirror directs or aligns the beam coming from the projection lamp onto the optical axis 15. A particular embodiment illustrated in FIG. 2 has the same reference numbers as in FIG. 1 for the parts of the same function. The arrangement of the projection lamp 24 flushly aligned with the axis 15 according to FIG. 1 can be difficult for reasons of construction. According to FIG. 2 now a projection lamp 24a can be aligned or directed onto a roof-edged (angled) mirror 37, which mirror is insertable or able to be pushed for example into the beam path at the base line 8 or yet is even arranged fixedly there, which mirror has two surfaces 38, 39 which are at right angles to each another. The surface 38 is completely coated with a metallic reflecting surface and for example carries a ruled or grate pattern, which pattern is projected on the object to be photographed, whereas the surface 39 is partially or semitransparent (or semireflecting), so that the reflected beam along the optical axis 15 can arrive on a photodiode row 6 through the surface 39.

In the framework of the invention numerous different embodiment examples are possible. For example a mirror can be provided with controllable reflectivity or reflecting power for example similar to the semi-conductor construction part described in U.S. Pat. No. 3,471,863 (which patent is hereby incorporated by reference herein), so that this construction part or component by choice is either transparent or reflecting. For the control of the reflection the output signal of the threshold value switch 19 can be used, advantageously after previous processing.

While I have disclosed several embodiments of the invention, it is to be understood that these embodiments are given by example only and not in a limiting sense.

I claim:

1. In a focusing device for the focusing movement of at least one member of an objective lens, with a passive range finding device comprising at least one photoelectric transducer device which is arranged on the axis of an optical system, by which transducer device in dependency on the contrast of the scene to be photographed, which scene is illuminated by the ambient light, a signal is able to be produced (passive range finding) and with an evaluation device for the signal which is produced by the photoelectric transducer device, by which evaluation device a special evaluation signal is produceable with insufficient contrast of the object to be photographed, the improvement comprising transmitting means for emitting an (active) range finding wave packet onto the object to be photographed, switching means for switching said transmitting means by the special evaluation signal, said transmitting means include a projection means for projecting a projection beam of electromagnetic waves in a projection beam path, the optical system includes a reflection mirror for the projection beam, by which the projection beam is alignable on the optical axis of the passive range finding device, the reflection mirror has a surface of controllable reflectivity, controlled by means of the special evaluation signal.

2. The focusing device as set forth in claim 1, wherein at least parts of the optical system of the passive range finding device are arranged in said beam path, said projection means for projecting a pattern on the object to be photographed.

3. The focusing device as set forth in claim 2, wherein said pattern is a light spot.

4. The focusing device as set forth in claim 1, wherein the reflection mirror at least during an active range finding operation has a semitransparent surface for the projecting beam.

5. The focusing device as set forth in claim 1, wherein a pattern to be projected on the object is applied on said reflection mirror.

6. The focusing device as set forth in claim 1, wherein a voluntarily actuatable interrupter is disposed between the evaluation device and said transmitting means.

7. The focusing device as set forth in claim 6, further comprising an indicator device, said interrupter is formed as a change-over switching means for changing the special evaluation signal over to said indicator device.

8. The focusing device as set forth in claim 1, wherein said switching means includes a self-holding circuit means for holding said transmitting means on.

9. The focusing device as set forth in claim 8, wherein said self-holding circuit means for being controlled by a camera shutter release and being opened with the camera shutter release located in a neutral position.

10. In a focusing device for the focusing movement of at least one member of an objective lens, with a passive range finding device comprising at least one photoelectric transducer device which is arranged on the axis of an optical system, by which transducer device in dependency on the contrast of the scene to be photographed, which scene is illuminated by the ambient light, a signal is able to be produced (passive range finding) and with an evaluation device for the signal which is produced by the photoelectric transducer device, by which evaluation device a special evaluation signal is produceable with insufficient contrast of the object to be photographed, the improvement comprising transmitting means for emitting an (active) range finding wave packet onto the object to be photographed, switching means for switching said transmitting means by the special evaluation signal, said transmitting means includes a projection means for projecting a projection beam of electromagnetic waves in a projection beam path, at least parts of the optical system of the passive range finding device are arranged in said beam path, said projection means for projecting a pattern on the object to be photographed, the optical system includes a reflection mirror for the projection beam, by which the beam is alignable on the optical axis of the passive range finding device, the reflection mirror has a surface of controllable reflectivity, controlled by means of the special evaluation signal.

11. The focusing device as set forth in claim 10, wherein a pattern to be projected on the object is applied on said reflection mirror.

12. The focusing device as set forth in claim 10, wherein said pattern is a light spot.

13. The focusing device as set forth in claim 10, wherein the reflection mirror at least during an active range finding operation has a semi-transparent surface for the projection beam.

14. The focusing device as set forth in claim 10, wherein a voluntarily actuatable interrupter is disposed between the evaluation device and said transmitting means.

15. The focusing device as set forth in claim 10, wherein said switching means includes a self-holding circuit means for holding said transmitting means on.

16. In a focusing device for the focusing movement of at least one member of an objective lens, with a passive range finding device comprising at least one photoelectric transducer device which is arranged on the axis of an optical system, by which transducer device in dependency on the contrast of the scene to be photographed, which scene is illuminated by the ambient light, a signal is able to be produced (passive range finding) and with an evaluation device for the signal which is produced by the photoelectric transducer device, by which evaluation device a special evaluation signal is produceable with insufficient contrast of the object to be photographed, the improvement comprising transmitting means for emitting an (active) range finding wave packet onto the object to be photographed, switching means for switching said transmitting means by the special evaluation signal, the optical system includes a reflection mirror, said reflection mirror has a surface of controllable reflectivity.

* * * * *